UNITED STATES PATENT OFFICE.

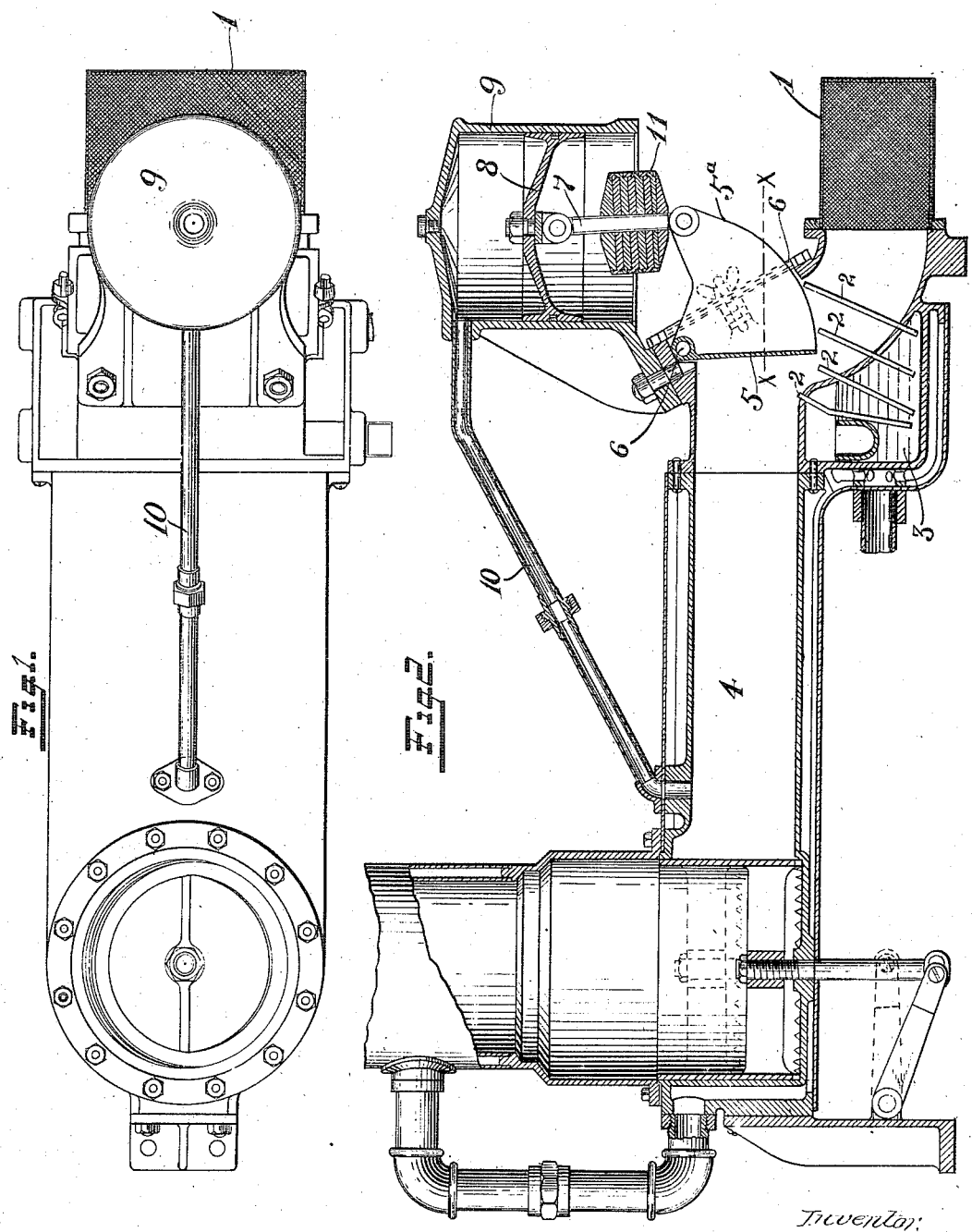
C. C. RIOTTE, DEC'D.
M. L. RIOTTE, ADMINISTRATRIX.
VAPORIZER.
APPLICATION FILED OCT. 1, 1908.
1,006,130.
Patented Oct. 17, 1911.
2 SHEETS—SHEET 1.
Inventor:
Carl C. Riotte, dec'd,
Marie L. Riotte
Administratrix
Witnesses:
Fred M. Dannenfelser
Ralph C. Powell
By his Attorneys.
Bartlett Brownell Mitchell

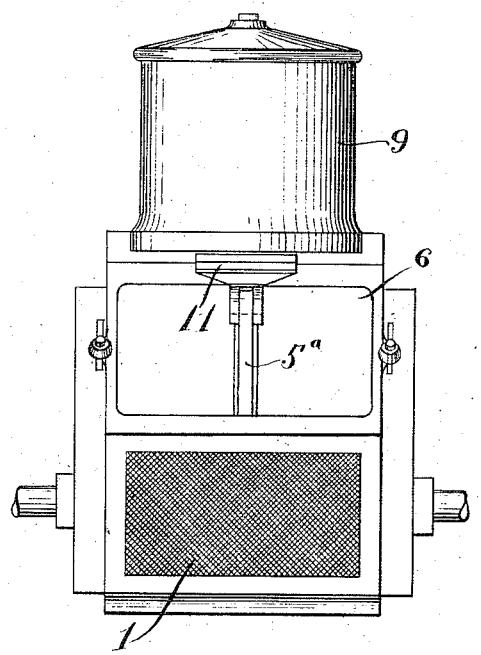

MARIE LOUISE RIOTTE, OF JERSEY CITY, NEW JERSEY, ADMINISTRATRIX OF CARL C. RIOTTE, DECEASED.

VAPORIZER.

1,006,130.  Specification of Letters Patent.  Patented Oct. 17, 1911.

Application filed October 1, 1908. Serial No. 455,765.

*To all whom it may concern:*

Be it known that CARL C. RIOTTE, late a citizen of the United States, did invent certain new and useful Improvements in Vaporizers, of which the following is a full, clear, and exact description.

My invention relates to improvements in vaporizers for internal combustion engines.

The object is to provide means whereby a variable quantity of a uniform mixture of gas and air may be provided at all times proportional to the speed and work of the engine with which the device is connected.

In the accompanying drawings, Figure 1 is a plan view of my improved vaporizer. Fig. 2 is, in the main, a vertical section, certain parts being shown in elevation. Fig. 3 is an end elevation of Fig. 1, looking from right to left. Fig. 4 is a sectional view taken substantially on the plane of the line $x$—$x$ of Fig. 2, certain parts being shown in elevation.

1 represents the air inlet pipe which may be screened in the usual manner.

2—2 are nozzles arranged in the path of air entering through inlet 1. These nozzles are supplied with fuel from any suitable source, for example, from the fuel tank 3, which in turn gets its supply from any suitable reservoir, not shown.

4 represents the mixture outlet pipe constituting a continuation of the inlet pipe 1 and located beyond the nozzles 2—2, and leading to the engine, not shown.

5 represents a damper preferably hinged at 6, and arranged to open or close, to a greater or less degree, the passage adjacent to the nozzles. This damper has a bracket 5ª which passes through a slot in a removable cap plate 6. This bracket is connected by a link 7 to a piston 8 located in a dash pot 9. The interior of the dash pot 9 is connected by means of a relatively small pipe 10 with the interior of the supply pipe 4, said connection with the dash pot being above the piston 8.

11 represents weights, for example in the form of disks, mounted upon the link 7 and arranged to properly counterbalance the vacuum, or partial vacuum, within the dash pot 9.

In the particular form of the invention shown, the vaporizer is adapted to engines of large horse power and to that end a relatively large number of nozzles 2—2 are provided, as seen in Figs. 2 and 4. In the preferred arrangement, these nozzles are arranged in parallel series extending obliquely across the suply pipe. The damper 5 is so arranged that, as it moves to and fro, it will not only open and close the air passage from the inlet 1 to the supply pipe 4, but it will also cut out of the draft of air one or more of the nozzles. It will thus be seen that by the movement of said damper not only is the volume of air admitted modified, but, to a corresponding extent so also is the fuel supply regulated whereby a relatively uniform mixture of gas and air will be found in pipe 4 to be delivered to the engine according to the demand of the latter.

Now as to the function of the dash pot 9. Obviously, as the speed of the engine increases and the demand for more fuel increases, a relative increase in vacuum will occur within the supply pipe 4. This relative increase in vacuum in said pipe produces within the dash pot 9 a correspondingly increased vacuum, by reason of the pipe connection 10. This moves the piston 8, so that, through the medium of the link 7 and bracket 5ª, the damper 5 will be opened to supply additional air and fuel. In practice, this occurs automatically and with such uniform precision as to provide the much sought for uniformity of mixture in supply pipe 4. To regulate or adjust the action of the dash pot, the weights 11—11 may be increased or diminished at will.

In practice, the usual throttle may be employed whereby a manual control may be had, but as this constitutes no part of this invention, it is unnecessary to describe it herein.

It should perhaps be stated that the area of the piston 8 should be sufficiently large to permit the partial vacuum within the pipe 4 (transmitted to the cylinder 9) to draw said piston 8 in a direction to open the damper 5 against the inrush of air tending to close the same. In the preferable form the area of the piston is so much greater than the cross-sectional area of the passage 4 that it requires the addition of the counter-weights 11 aforesaid, since this affords one very simple and constant means for regulating the operation of the damper controlling means.

What I claim is:

1. In a vaporizer, an air passage therein, a plurality of fuel supply devices arranged in said passage, a damper in said passage arranged to open and close the same and also arranged to cut out one or more of said fuel supply devices from or include the same in the draft through said passage and means controllable by variation in pressure in said passage for moving said damper, said means operating to move said damper to open said passage as the pressure therein decreases and vice versa.

2. In a vaporizer, an air passage, a plurality of separate fuel sprayer tips projecting therein, a damper in said passage arranged to open and close the same and arranged to cut out one or more tips from, or include the same in, the intake draft through said passage, means for automatically opening said damper comprising a dash pot open to the atmosphere at one end and a pipe connecting the interior of said dash pot with said air passage, a piston in said dash pot, said piston being connected to said damper whereby reduction of pressure in said passage will be communicated to said dash pot and the piston therein to open said damper.

3. In a vaporizer, an air passage, a plurality of separate fuel sprayer tips projecting therein, a damper in said air passage arranged to open and close the same and to cut out one or more tips from, or include the same in, the intake draft through said passage, means for automatically opening said damper comprising a dash pot open to the atmosphere at one end and a pipe connecting the interior of said dash pot with said air passage at a point beyond said fuel sprayer tips, a piston therein, a connection from the piston to the damper, whereby reduction of pressure in said passage will be communicated to said piston to open said damper.

4. In a vaporizer, an air passage therein, a plurality of fuel supply devices projecting into said passage, a damper plate in said passage arranged to open and close the same and also arranged to cut out one or more of said fuel supply devices from, or include the same in, the draft through said passage and means controllable by variation in pressure in said passage for moving said damper, including a dash pot and a piston therein connected with said damper, said dash pot being open to the atmosphere at one end and being in communication with the interior of the draft passage at its other end and a counterweight for said damper.

5. In a vaporizer, an air passage therein, a plurality of open ended fuel supply devices projecting into the line of draft through said passage, a damper adjacent to the open ends of said fuel supply devices and also in said line of draft, said damper operating to check the draft over the open end of one or more of said fuel supply devices depending upon the position of said damper and means to vary the position of said damper in proportion to the vacuum within the passage, said damper moving in a direction to expose more and more of said fuel supply devices to the draft as said vacuum increases and vice versa.

6. In a vaporizer, an air passage therein, a plurality of open ended fuel supply devices projecting into the line of draft through said passage, a damper adjacent to the open ends of said fuel supply devices and also in said line of draft, said damper operating to check the draft over the open end of one or more of said fuel supply devices depending upon the position of said damper, means to vary the position of said damper in proportion to the vacuum within the passage, said damper moving in a direction to expose more and more of said fuel supply devices to the draft as said vacuum increases and vice versa, said means including a cylinder and piston, the latter being connected to the damper and an air pipe or passage leading from said cylinder at a point in the rear of said piston to the air passage at a point beyond the damper.

7. In a vaporizer, an air passage therein, a plurality of open ended fuel supply devices projecting into the line of draft through said passage, a damper adjacent to the open ends of said fuel supply devices and also in said line of draft, said damper operating to check the draft over the open end of one or more of said fuel supply devices depending upon the position of said damper, means to vary the position of said damper in proportion to the vacuum within the passage, said damper moving in a direction to expose more and more of said fuel supply devices to the draft as said vacuum increases and vice versa, said means including a cylinder and piston, the latter being connected to the damper, an air pipe or passage leading from said cylinder at a point in the rear of said piston to the air passage at a point beyond the damper, and including means to normally move the piston and damper in a direction to cut off the draft over said open ended fuel supply devices.

8. In a vaporizer, an air passage therein, a plurality of open ended fuel supply devices projecting into the line of draft through said passage, a damper adjacent to the open ends of said fuel supply devices and also in said line of draft, said damper operating to check the draft over the open end of one or more of said fuel supply devices depending upon the position of said damper, means to vary the position of said damper in proportion to the vacuum within the passage, said damper moving in a direction to expose more and more of said fuel supply devices to the draft as said vacuum increases and vice versa, said means including a cylinder and piston, the latter being connected to the damper, an air pipe or passage leading from said cylinder at a point in the rear of said piston to the air passage at a point beyond the damper, and including means to normally move the piston and damper in a direction to cut off the draft over said open ended fuel supply devices, said last mentioned means comprising a weight actuated by gravity in a direction to secure said result.

In witness whereof I have hereunto set my hand this eighth day of September 1908 in the presence of two subscribing witnesses.

MARIE LOUISE RIOTTE,
*Administratrix of the estate of Carl C. Riotte, deceased.*

Witnesses:
   J. ARMOUR GALLOWAY,
   AMITA RIO GALLOWAY.